Dec. 2, 1930. J. H. EDMONDS 1,783,329
VALVE
Filed Jan. 16, 1928

INVENTOR
John H. Edmonds
BY
Frank Warren
ATTORNEY

Patented Dec. 2, 1930

1,783,329

UNITED STATES PATENT OFFICE

JOHN H. EDMONDS, OF SEATTLE, WASHINGTON, ASSIGNOR OF ONE-THIRD TO JOSEPH E. BELLAM, OF SEATTLE, WASHINGTON

VALVE

Application filed January 16, 1928. Serial No. 246,938.

This invention relates to improvements in shut off valves and the general object of my invention is to provide a valve of extremely simple and strong construction in which all of the wearing parts are readily accessible for repairs or replacement.

Another object is to provide a shut off valve of this nature which allows a straight passage of fluid through the valve and offers the least possible obstruction to the flow of the fluid when the valve is partially or entirely open.

Another object is to provide a valve in which the valve member proper has two discs or plates that are urged outwardly against the respective ends of the valve housing by springs in such a manner that they will always make close, leak proof, contact with the valve housing, said discs being readily removable when the ends of the housing are taken off.

Other and more specific objects will be apparent from the following description taken in connection with the accompanying drawings.

In the drawings Figure 1 is a vertical section on a line 1—1 of Fig. 2 of a valve constructed in accordance with this invention parts being shown in elevation.

Figure 1:
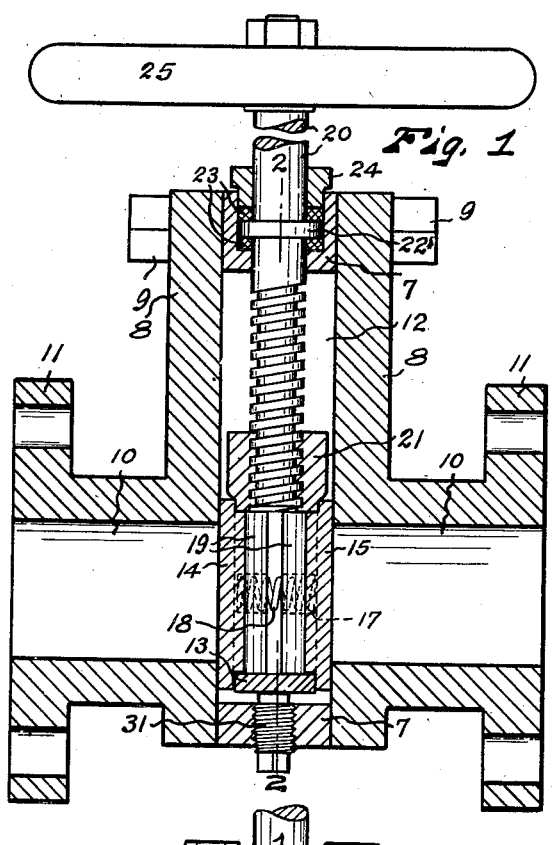
Figure 5:
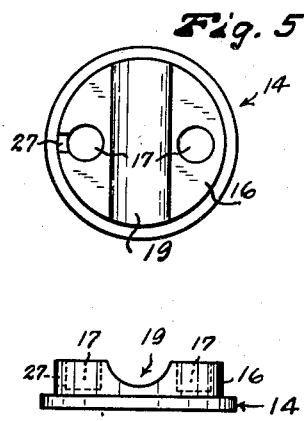
Fig. 5 is a detached plan view showing the inside of one of the valve discs.
Figure 6:
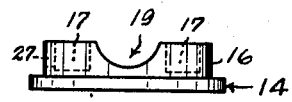
Fig. 6 is an edge view of said valve disc.

Referring to the drawings throughout which like reference numerals designate like parts, 7 is a valve housing member of substantially rectangular shape having end plates 8 secured thereto by cap screws or bolts 9. The end plates 8 are provided with tubular bosses 10 having flanges 11 by which they may be connected in a well known manner with fluid conduit pipes, not shown.

The housing member 7 has an internal cavity 12 of approximately rectangular shape wherein is disposed a valve member that is made up of a carrier or valve ring 13 and two valve discs 14 and 15 of duplicate construction. The valve ring 13 has an open center for the reception of cylindrical extensions 16 on the discs and the peripheries of the discs form flanges that are adapted to overlap and rest against the ring 13. Each extension 16 has holes 17 therein for the reception of the ends of compression springs 18, two or more of which are provided for urging the discs 14 and 15 out against the ends of the valve housing. The extensions 16 are arcuately recessed as at 19 between the spring receiving holes 17 to afford clearance for a valve stem 20 that is threaded through a boss 21 on the top of the valve ring 13. The valve stem 20 passes outwardly through suitable bearing and packing means in the top end of the housing 7, said stem being provided with an annular flange 22 supported between two packing rings 23 that are held in place by the housing 7 and by a cap member 24 that is secured to said housing. A hand wheel 25 is secured to the top end of the valve stem 20.

Stud pins 26 extend inwardly from one side of the valve ring 13 and notches 27 in the cylindrical extensions 16 fit over said stud pins to prevent rotary movement of the disc members 14 and 15 in the ring 13. Bearing lugs 28 on the sides of the ring 13 are disposed in close proximity to straight bearing surfaces 29 within the valve member 7 to guide the ring and a similar lug 30 is provided on the bottom of said ring to strike against a set screw 31 which serves as a stop.

Figure 2:
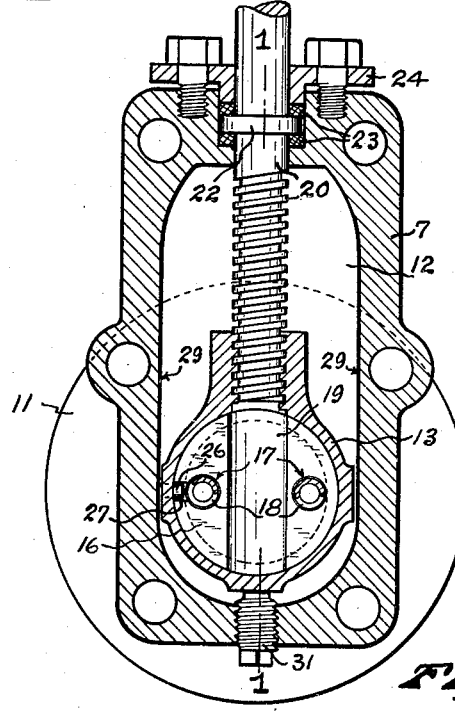
Fig. 2 is a vertical section substantially on line 2—2 of Fig. 1.
Figures 3, 4:
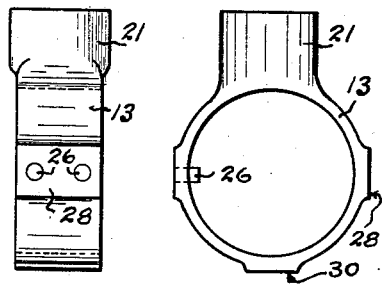
Fig. 3 is a detached elevation of a valve ring.
Fig. 4 is an edge view of said valve ring.

To close the valve, the valve member is moved to its lowermost position thereby bringing the discs 14 and 15 directly over the openings in the end plates as shown in Figs. 1 and 2. To open the valve the screw threaded stem 20 is turned in the proper direction to lift the valve member and uncover the openings in the end plates. The springs 18 keep the discs 14 and 15 always pressed out against the end plates thereby preventing leakage. The wear due to opening and closing is all in a straight line and such wear will be taken up by the springs 18 as fast as it occurs. The discs 14 and 15 are readily replaced when the end plates are removed and the end plates may be easily taken off and ground or planed down or replaced by new ones in case they become worn.

The valve is strong and simple in construction, efficient in operation and inexpensive to manufacture.

The foregoing description and accompanying drawings clearly disclose a preferred embodiment of my invention but it will be understood that this disclosure is merely illustrative and that changes may be made within the scope and spirit of the following claims.

What I claim is:—

1. In a valve, a housing member having an open central portion of rectangular shape, end plates removably secured to said housing member and having aligned passageways that register with the open central portion of the housing member, a valve ring arranged for movement within the housing member, a stem having threaded engagement with the valve ring for moving the same into and out of alignment with the passageways in said end plates, two disks having cylindrical portions telescoped within said ring, said discs having radial grooves in their inner faces affording clearance for said stem when the valve is opened, flanges on said disks arranged to engage the outer side of said ring, springs between the discs for yieldingly holding the same against the end plates, and adjustable means on the bottom of said housing for limiting the downward movement of said valve ring.

2. In a valve, a housing member having an open central portion of rectangular shape, end plates secured to said housing member and having aligned passageways that register with each other and with the open portion of the housing member near one end of said open portion, a valve ring movably disposed within the open central portion of said housing member, an internally threaded hub on the upper end of said valve ring, a stem threaded into said hub for moving said ring into and out of alignment with the passageways in said end plates, the end of said stem being clear of said passageways at all times, two discs having cylindrical portions telescoped within said ring, said cylindrical portions having diametrically arranged grooves in their inner sides to afford clearance for said stem and being provided with spring receiving recesses and having notches extending from one side inwardly, said discs also having flanged portions arranged to engage the outer sides of said ring, the contacting surfaces of said housing member and said end plates being flat and the outer surfaces of said discs being flat for slidably engaging the flat inner surfaces of said end plates, stud pins rigid with said ring for engaging within the notches in said discs to prevent rotary movement of said discs in said ring, and compression springs interposed between said two discs and fitting within said spring receiving recesses for yieldingly holding the same against the end plates.

In witness whereof, I hereunto subscribe my name this 4th day of January A. D. 1928.

JOHN H. EDMONDS.